United States Patent Office.

MARTHA HUDDLESTON, OF JACKSON, TENNESSEE.

Letters Patent No. 112,920, dated March 21, 1871.

IMPROVEMENT IN MEDICAL COMPOUNDS, OR SALVES.

The Schedule referred to in these Letters Patent and making part of the same.

*To all whom it may concern:*

Be it known that I, MARTHA HUDDLESTON, of Jackson, in the county of Madison and in the State of Tennessee, have invented certain new and useful Salve; and do hereby declare that the following is a full, clear, and exact description thereof—

My salve is composed of the following ingredients, in about the proportions mentioned—

One pound of resin, one pound of beeswax, one pound of lard, one pound of tobacco, one-fourth ounce liquorice, one ounce fresh butter.

Put the tobacco into one quart of warm water, and let it stand for twenty-four hours. Squeeze out well, so as to get all the strength, then put all the ingredients into an iron pot; cover close, and cook it slowly, until all the water is out. It is then ready for use.

This salve will be found very valuable in the cure of carbuncles, old ulcers, erysipelas, burns, cuts, bruises, sprains, swellings in the joints, or, in fact, any and all risings or eruptions.

It is also valuable for ladies' breasts, and to apply to the chests of children, for croup.

In all cases where it is applied, it should be spread thin on linen cloth, and laid on the affected parts.

I do not confine myself to the precise proportions herein mentioned for the mixture of the ingredients, as the proportions may perhaps be varied in some cases.

Having thus fully described my invention,

What I claim as new, and desire to secure by Letters Patent, is—

The within described salve, composed substantially of the ingredients herein set forth.

In testimony that I claim the foregoing, I have hereunto set my hand, this 1st day of February, 1871.

MARTHA HUDDLESTON.

Witnesses:
 P. M. HUDDLESTON,
 R. R. CORBITT.